United States Patent
Maki et al.

(10) Patent No.: US 8,966,365 B2
(45) Date of Patent: Feb. 24, 2015

(54) SOUND OUTPUT SETTING APPARATUS, METHOD, AND COMPUTER-EXECUTABLE PROGRAM

(75) Inventors: Koutaroh Maki, Tokyo (JP); Mikio Hagiwara, Machida (JP)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 445 days.

(21) Appl. No.: 13/106,670

(22) Filed: May 12, 2011

(65) Prior Publication Data

US 2011/0283191 A1      Nov. 17, 2011

(30) Foreign Application Priority Data

May 12, 2010   (JP) .................................. 2010-110439

(51) Int. Cl.
  *G06F 3/01*   (2006.01)
  *G06F 3/16*   (2006.01)
(52) U.S. Cl.
  CPC ............... *G06F 3/165* (2013.01); *G06F 3/167* (2013.01)
  USPC ............................ 715/716; 715/727; 715/728
(58) Field of Classification Search
  CPC .................................. G06F 3/165; G06F 3/167
  USPC .......................................... 715/716, 727, 728
  See application file for complete search history.

(56) References Cited

U.S. PATENT DOCUMENTS

| | | | |
|---|---|---|---|
| 7,571,014 B1 * | 8/2009 | Lambourne et al. | 700/94 |
| 7,706,903 B2 * | 4/2010 | Champion et al. | 700/94 |
| 2004/0228623 A1 * | 11/2004 | Saito et al. | 395/750.01 |
| 2005/0069101 A1 * | 3/2005 | Bear et al. | 379/88.17 |
| 2005/0233777 A1 * | 10/2005 | Twerdahl | 455/567 |
| 2006/0174308 A1 * | 8/2006 | Fuller et al. | 725/133 |
| 2007/0150719 A1 * | 6/2007 | Bear et al. | 713/100 |
| 2010/0010653 A1 * | 1/2010 | Bear et al. | 700/94 |
| 2011/0182441 A1 * | 7/2011 | Coffman et al. | 381/107 |
| 2012/0023404 A1 * | 1/2012 | Liu et al. | 715/716 |
| 2012/0260170 A1 * | 10/2012 | Bhogal et al. | 715/716 |

FOREIGN PATENT DOCUMENTS

JP         2004234505         8/2004

* cited by examiner

*Primary Examiner* — Anil Bhargava
(74) *Attorney, Agent, or Firm* — Kunzler Law Group (57) ABSTRACT

An apparatus, system, and method are disclosed for an information processing apparatus capable of allowing a user to select appropriate processing beforehand when an application program outputs sound in a state in which an audio device is silenced. The apparatus in one embodiment includes a silencing module for silencing audio information output from an audio device, a detection module for detecting a sound playback request from an application program while silencing is set, a display module for displaying a select screen for allowing a user to select processing when the sound playback request from the application program is detected by the detection module, and a processing module for executing the processing selected by the user on the select screen.

19 Claims, 7 Drawing Sheets

SOUND OUTPUT SETTING APPARATUS, METHOD, AND COMPUTER-EXECUTABLE PROGRAM

CROSS-REFERENCE TO RELATED APPLICATIONS

This application is a national patent application and claims priority to Japanese Patent Application Number 2010-110439 entitled "Sound Output Setting Apparatus, Method, and Computer-Executable Program" and filed on May 12, 2010 for Koutaroh Maki and Mikio Hagiwara, which is incorporated herein by reference.

BACKGROUND

1. Field

The subject matter disclosed herein relates to an information processing apparatus, method, and computer-executable program.

2. Description of the Related Art

In an information processing apparatus such as a personal computer (hereinafter referred to as a "PC"), recording, playback, and communication of audio information are possible. The user of the information processing apparatus can set the output of the audio information in two ways. That is, the user selects "Mute OFF" so that sound is always output and selects "Mute ON" so that no sound is output.

When a PC is set to a state where sound is always output, although the user can hear the sound, if the sound data is not what was intended or the volume is too high, the sound may cause discomfort to the surrounding people. Although using headphones may be thought to prevent annoyance to the surrounding people, it is difficult to carry them around constantly, and the user wearing headphones cannot hear surrounding sound well.

On the other hand, while the PC is silenced, the user cannot hear the sound and cannot know whether or not sound is being output.

BRIEF SUMMARY

The apparatus to process information is provided with a plurality of modules configured to functionally execute the necessary steps of processing information. These modules in the described embodiments include a silencing module for silencing audio information output from an audio device; detection module for detecting a sound playback request from an application program while silencing is set; display module for displaying a select screen for allowing a user to select processing when the sound playback request from the application program is detected by the detection module; and processing module for executing the processing selected by the user on the select screen.

In the information processing apparatus, in one embodiment when the user selects to disable the silencing of the external output of the audio information on the select screen, the processing module causes the silencing module to disable the silencing of the audio information.

In the information processing apparatus, in one embodiment when the user selects to disable the silencing of the external output of the audio information for a predetermined period on the select screen, the processing module causes the silencing module to disable the silencing of the audio information for the predetermined period.

In the information processing apparatus, in one embodiment, when the user selects to disable the silencing of only a present audio stream on the select screen, the processing module causes the silencing module to disable the silencing of the audio information only for a period while the present audio stream is output.

A system is also presented to process information. In particular, the system, in one embodiment, includes an audio device that outputs audio information; an audio driver that controls the external output of the audio information of the audio device; an audio service that receives a sound playback request from an application program and outputs the sound playback request to a kernel-mode driver; a filter driver that intercepts the sound playback request while the audio device is silenced and outputs a select screen display request; and a user interface that displays a select screen for allowing a user to select processing when the select screen display request is received, in which the filter driver causes the audio driver to execute the processing selected by the user on the select screen.

A method is also presented for sound output setting. The method in the disclosed embodiments substantially includes the steps necessary to carry out the functions presented above with respect to the operation of the described apparatus and system. In one embodiment, the method includes silencing audio information output from an audio device; detecting a sound playback request from an application program while silencing is set; displaying a select screen for allowing a user to select processing when the sound playback request from the application program is detected in the detecting step; and executing the processing selected by the user on the select screen.

In a further embodiment, a computer-executable program is employed for causing a computer to execute the steps of: silencing audio information output from an audio device; detecting a sound playback request from an application program while silencing is set; displaying a select screen for allowing a user to select processing when the sound playback request from the application program is detected in the detecting step; and executing the processing selected by the user on the select screen.

The information processing apparatus according to the above aspect includes a silencing module for silencing audio information output from an audio device; detection module for detecting a sound playback request from an application program while silencing is set; display module for displaying a select screen for allowing a user to select processing when the sound playback request from the application program is detected by the detection module; and processing module for executing the processing selected by the user on the select screen. Therefore, it is possible to provide an information processing apparatus capable of allowing a user to select appropriate processing beforehand when an application program outputs sound in a state where an audio device is silenced.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Figure 1:
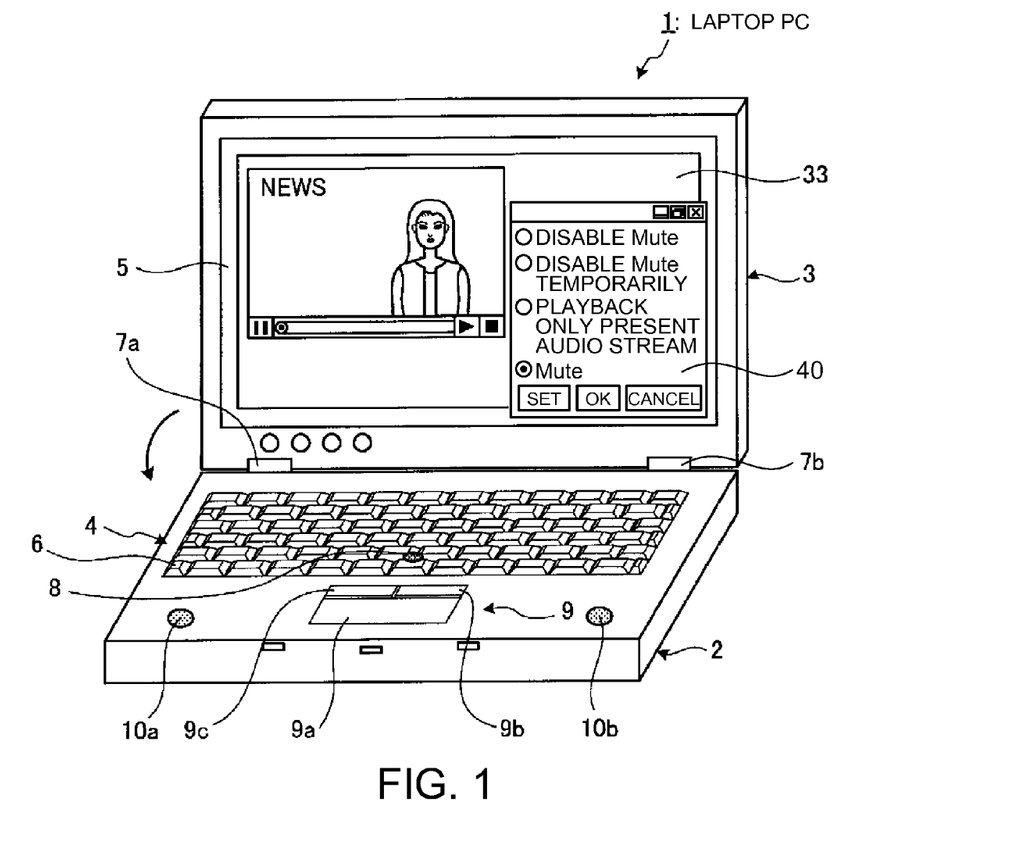
FIG. 1 is a schematic block diagram illustrating one embodiment of a laptop PC in which an information processing apparatus may be employed.

FIG. 1 depicts a schematic perspective view of a laptop PC to which an information processing apparatus is applied. While a laptop PC is shown by way of example, the embodiments described herein may be used with other types of computing devices.

As shown in FIG. 1, a laptop PC 1 according to one embodiment includes an approximately rectangular body-side casing 2 and a display-side casing 3. The body-side casing 2 and the display-side casing 3 are connected by a pair of left and right connection portions (hinge portions) 7a and 7b which are provided at the respective ends. The connection portions 7a and 7b support the casings 2,3 when the casings 2,3 are opened and closed.

The display-side casing 3 includes a display device 5 on which various kinds of information are displayed in accordance with a command from the body-side casing 2. The body-side casing 2 includes an input section 4 which is provided on an upper surface thereof. The input section 4 includes a keyboard 6, a track point 8 disposed within the keyboard 6, a touch pad 9, and the like. The touch pad 9 includes a pad surface 9a, a right button 9b, and a left button 9c. Moreover, the body-side casing 2 includes speakers 10a and 10b on the left and right sides of the touch pad 9, and stereo sound can be output.

In the present embodiment, when a sound playback request is input from an application program 33 (in FIG. 1, the window of the application program 33 is denoted by "33") in a state where silencing (Mute ON) of sound output is set, the body-side casing 2 displays a select screen 40 for allowing the user to select appropriate processing on the display device 5 and executes a process selected by the user (this process will be referred to as a "user-selected sound output process"). In this way, it is possible to allow the user to select appropriate processing beforehand when the application program 33 outputs sound in a state where the sound output is muted. In the display example of the select screen 40 of FIG. 1, the user can select one from among four options which are (1) Disable Mute; (2) Disable Mute Temporarily; (3) Playback Only Present Audio Stream; and (4) Mute.

Figure 2:
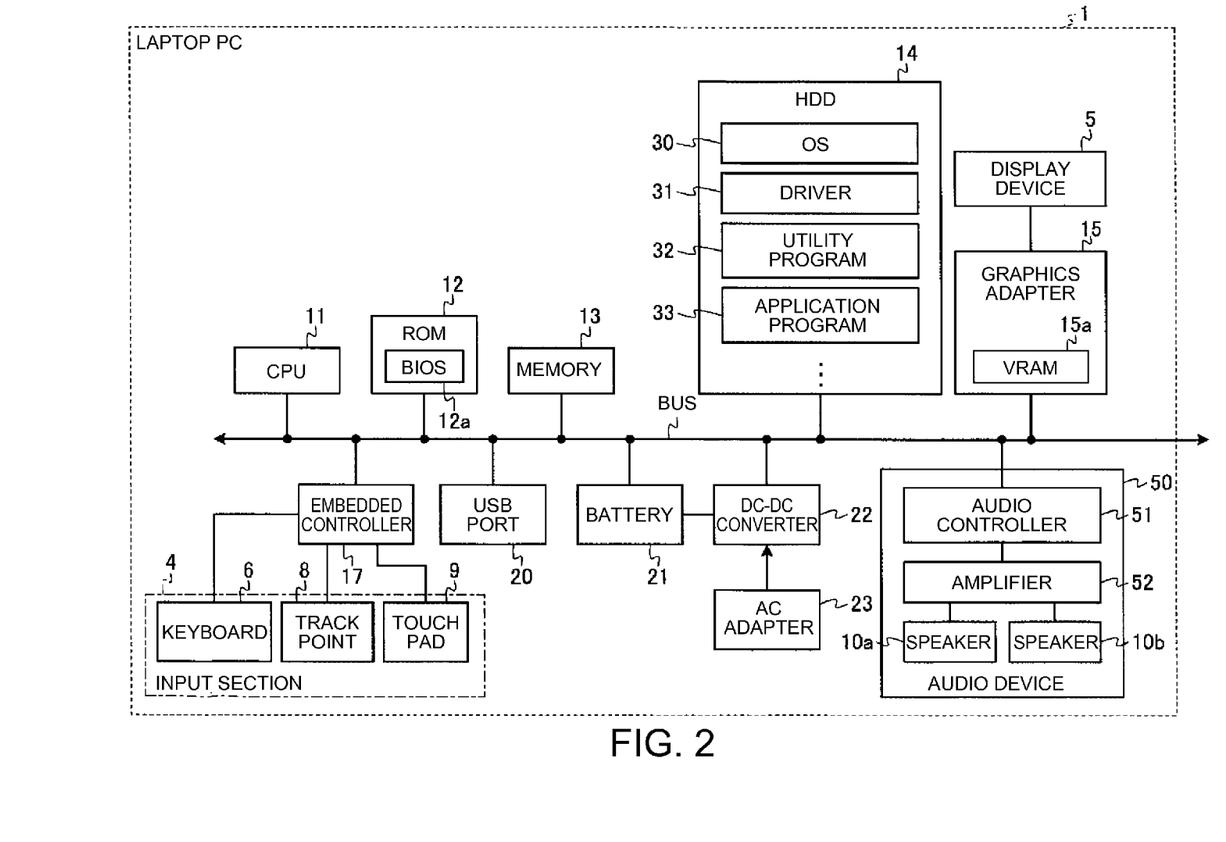
FIG. 2 is a schematic block diagram illustrating one embodiment of the laptop PC of FIG. 1.

FIG. 2 is a diagram showing a schematic hardware configuration example of the laptop PC shown in FIG. 1. As shown in FIG. 2, the laptop PC 1 includes a CPU 11, a ROM 12, a memory 13, a HDD (hard disk) 14, a graphics adapter 15, a display device 5, a keyboard 6, a track point 8, a touch pad 9, an embedded controller 17, a USB port 20, a battery 21, a DC-DC converter 22, an AC adapter 23, and an audio device 50 which are connected through a bus.

The CPU 11 controls the overall operation of the laptop PC 1 with an OS 30 stored in the HDD 14 connected through the bus and performs a function of executing processing based on various programs stored in the HDD 14. The ROM 12 stores a BIOS (Basic Input/Output System) 12a, data, and the like.

The memory 13 is formed of a cache memory or a RAM and is a writeable memory which is used as a read area of programs executed by the CPU 11 or a work area in which the data processed by the programs being executed is written.

The HDD (hard disk) 14 has a function of storing the OS 30 for controlling the overall operation of the laptop PC 1, as well as various drivers 31 for controlling hardware, utility programs 32 for extending the function of the OS 30, and application programs 33 designed for special tasks.

The OS 30 controls a basic operation of the laptop PC 1 and manages various resources to deliver commands issued by the application programs 33 to the drivers 31 and the BIOS 12a. Moreover, the OS 30 has a multi-tasking function and a multi-window function and also manages the execution contexts (register sets, main memory images, and file handles used by one of the application programs 33) of the application programs 33 and software resources such as components of a GUI (graphical user interface). Furthermore, the OS 30 includes an audio service 30a (see FIG. 3) for managing the audio device 50 and a UI program 30b (see FIG. 3) for displaying a GUI. Examples of the OS 30 which may be used include, Windows XP (registered trademark), Windows Vista (registered trademark), Windows 7 (registered trademark), and the like.

The various drivers 31 are for operating the peripheral hardware devices and include a display driver for displaying images on the display device 5, an input driver for operating the input section 4, an audio driver 31a (see FIG. 3) for operating the audio device 50, a filter driver 31b (see FIG. 2) for controlling the execution of the above-described user-selected sound output process, and other drivers.

The graphics adapter 15 converts drawing information into video signals in accordance with the control of the CPU 11 and outputs the converted video signals to the display device 5. The graphics adapter 15 includes a VRAM 15a in which drawing information is written, a graphic chip for converting the drawing information written to the VRAM 15a into video signals and outputting the video signals to the display device 5, and the like.

The display device 5 is a liquid crystal display, an organic EL display, a plasma display, a CRT, or the like, and displays various kinds of information corresponding to the video signals input from the graphics adapter 15 under the control of the CPU 11.

The embedded controller 17 controls the operation of the keyboard 6 which includes various keys for inputting characters, commands, and the like, the track point 8 and touch pad 9 for moving a cursor on a screen or selecting various menus, and the like.

The AC adapter 23 is connected to a commercial power source so as to convert an AC voltage into a DC voltage and output the DC voltage to the DC-DC converter 22. The DC-DC converter 22 converts the DC voltage supplied from the AC adapter 23 into a predetermined voltage, supplies power to the respective sections, and charges the battery 21. The battery 21 is charged by the DC-DC converter 22 and supplies a charged voltage to the respective sections when the AC adapter 23 is not connected.

The audio device 50 includes an audio controller 51, an amplifier 52, and the speakers 10a and 10b. The audio controller 51 performs the input/output control of audio information handled by the system and receives audio information from the audio driver 31a executed by the CPU 11 to generate an output sound signal based on the audio information and outputs the sound signal to the amplifier 52. Upon receiving a mute command from the audio driver 31a, the audio controller 51 stops the operation of the amplifier 52 in accordance with the mute command so as to silence the sound output. Moreover, the audio controller 51 sets an audio volume setting value input from the audio driver 31a to the amplifier 52.

The amplifier 52 amplifies the sound signal input from the audio controller 51 and outputs sound corresponding to the sound signal through the speakers 10a and 10b. The gain of the amplifier 52 is controlled by a sound volume adjustment. Moreover, upon receiving the mute command from the audio controller 51, which is generated in response to pressing a mute button, the amplifier 52 stops an amplification operation so as to silence the sound output.

The speakers 10a and 10b are loudspeakers that output sound in the audible frequency band in accordance with the sound signal amplified by the amplifier 52.

Figure 3:
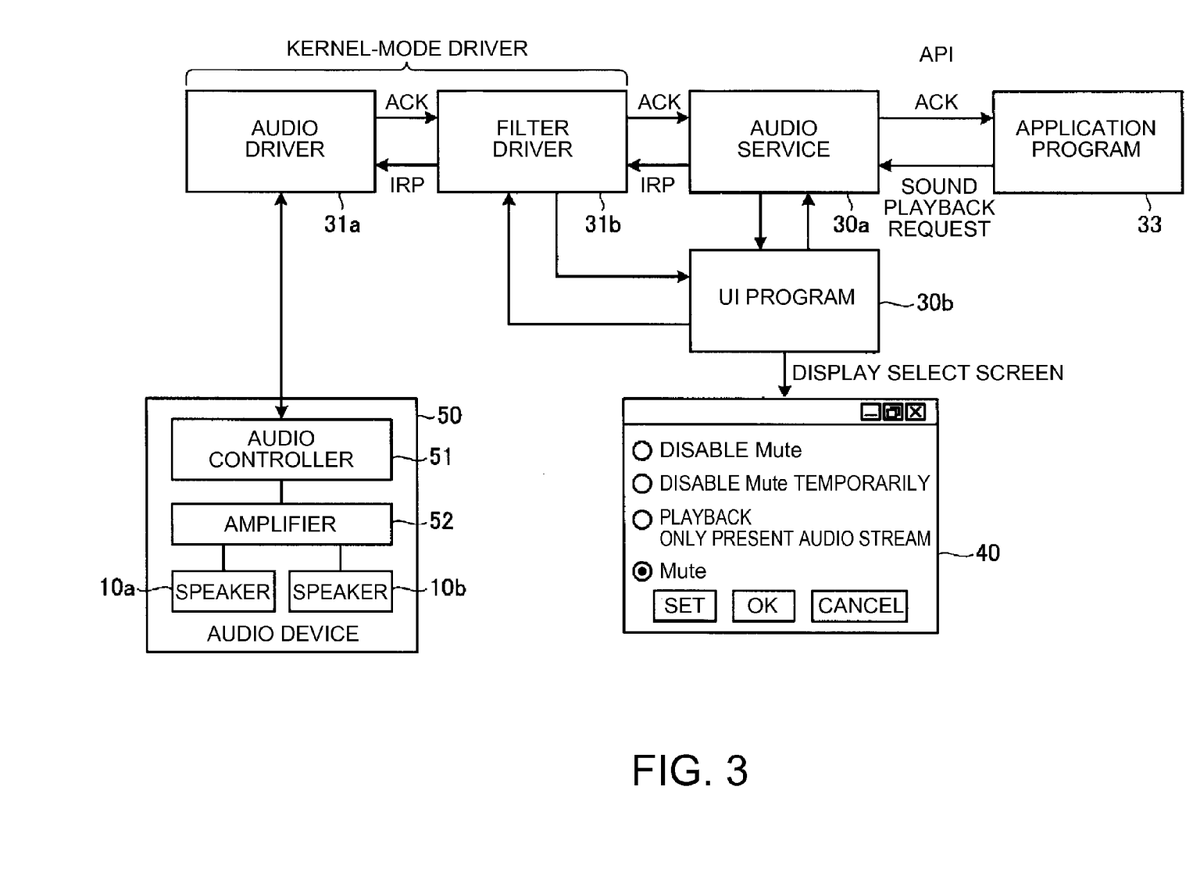
FIG. 3 is a schematic block diagram illustrating one embodiment of a functional configuration concerning the sound output of an audio device of the laptop PC shown in FIG. 2.

FIG. 3 is a diagram schematically showing an embodiment of a functional configuration concerning the sound output of the audio device 50 of the laptop PC 1 shown in FIG. 2.

In FIG. 3, the audio driver 31a controls the external output of the audio information of the audio device 50 in accordance with the settings on a volume adjustment screen (not shown). The user can set Mute, an audio volume, and the left/right balance of the speakers 10a and 10b on the volume adjustment screen. The Mute setting on the volume adjustment screen and the select screen 40 is interlocked so that when the setting on one of the screens is changed to Mute ON or Mute OFF, the setting on the other screen is changed to a corresponding setting.

The audio service 30a manages the audio device 50 and receives a sound playback request from the application program 33 to output the sound playback request (IRP: I/O Request Packet) to a kernel-mode driver. The application program 33 sequentially transmits the sound playback request to the audio service 30a in units of predetermined packets, and whenever ACK is received from the audio service 30a, a next sound playback request is transmitted to the audio service 30a.

The filter driver 31b executes the above-described user-selected sound output process. When Mute is set to be ON, the filter driver 31b intercepts the sound playback request (IRP) and outputs a select screen display request to the UI program 30b. In one example, the display request is a window pop up.

When the select screen display request is received from the filter driver 31b, the UI program 30b displays the select screen 40 for allowing the user to select processing. The user selects a desired process from among the four options: (1) Disable Mute; (2) Disable Mute Temporarily; (3) Playback Only Present Audio Stream; and (4) Mute, which appear on the select screen 40. The filter driver 31b causes the audio driver 31a to execute the processing selected by the user on the select screen 40.

Figure 4:
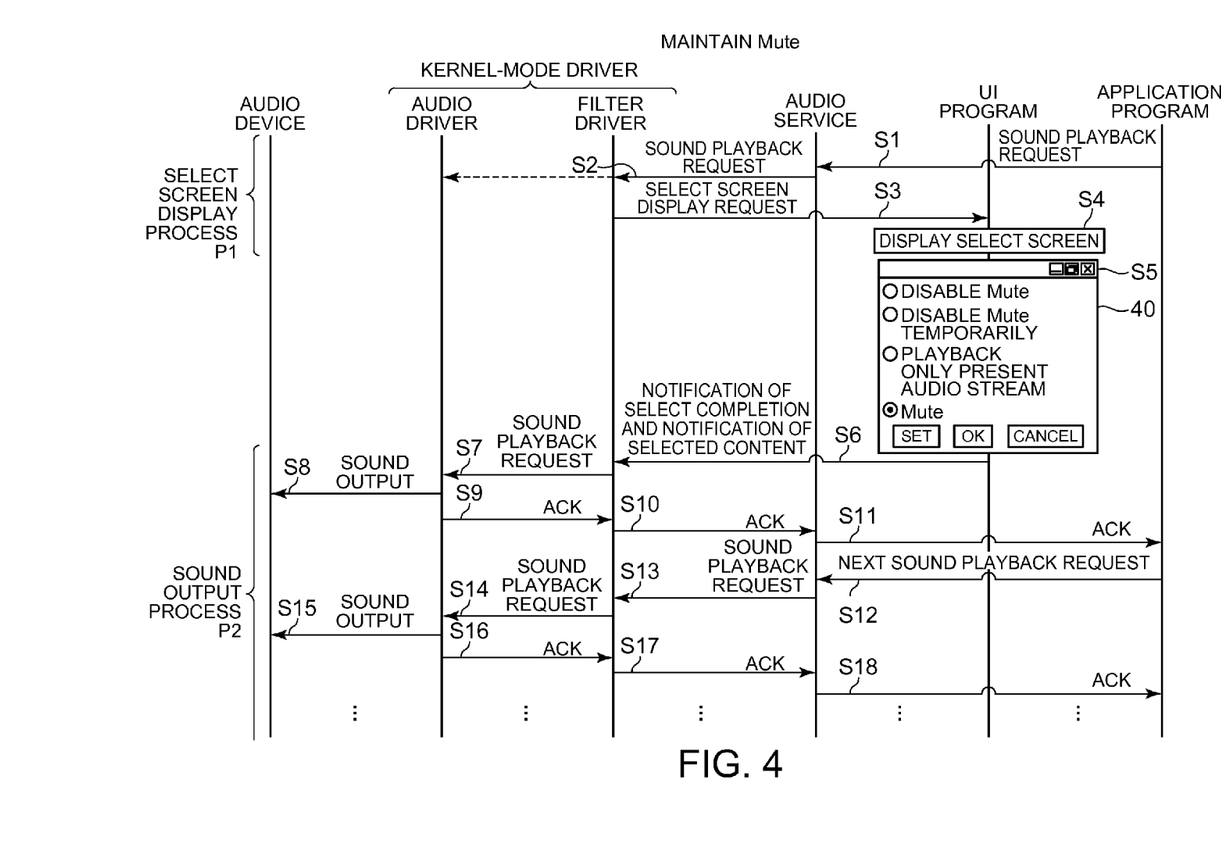
FIG. 4 is a schematic flow chart diagram illustrating one embodiment of a user-selected sound output process where Mute is selected on a select screen.
Figure 5:
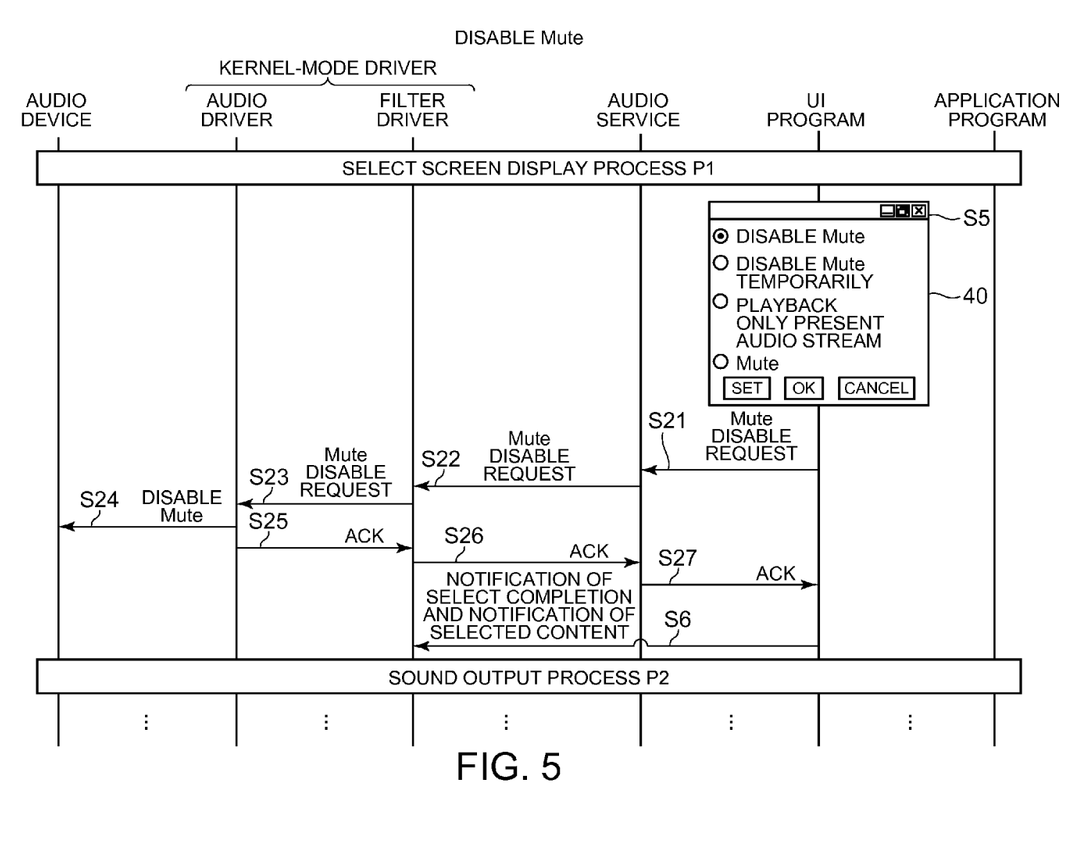
FIG. 5 is a schematic flow chart diagram illustrating one embodiment of a user-selected sound output process where disable Mute is selected on a select screen.
Figure 6:
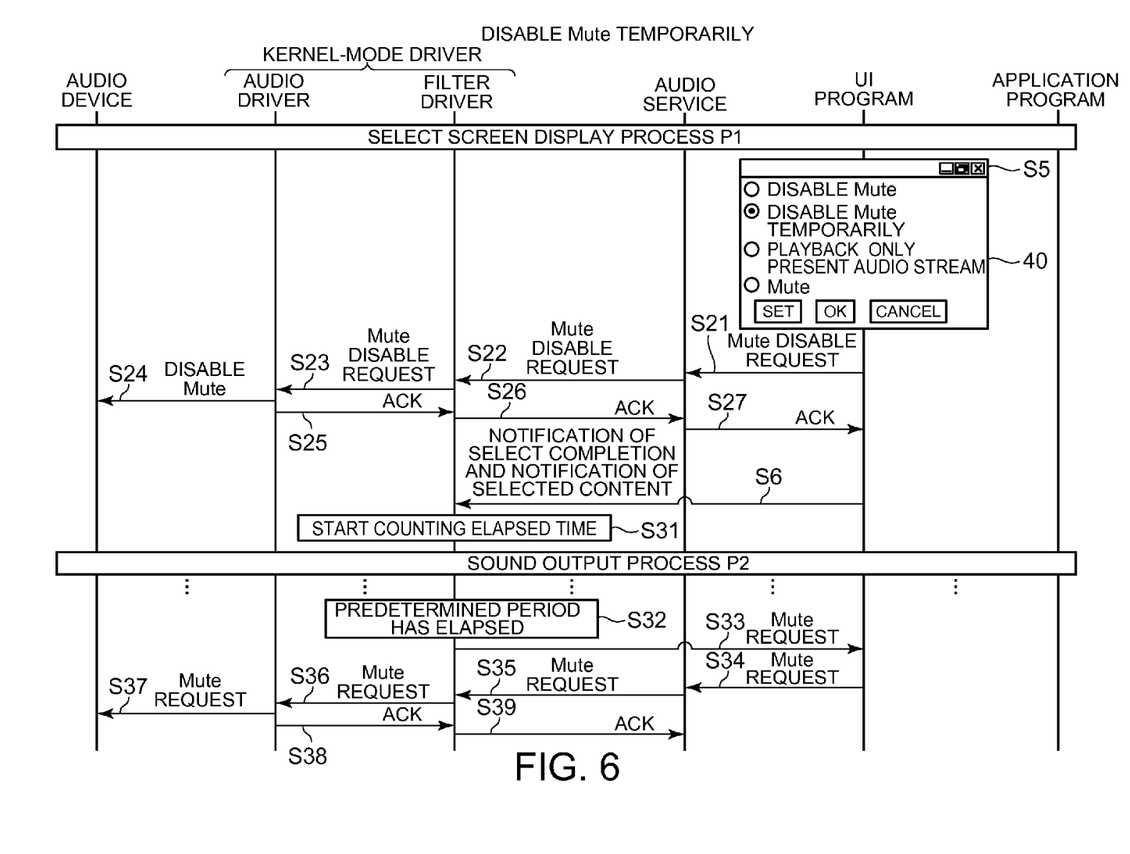
FIG. 6 is a schematic flow chart diagram illustrating one embodiment of a user-selected sound output process where disable Mute is temporarily selected on a select screen.
Figure 7:
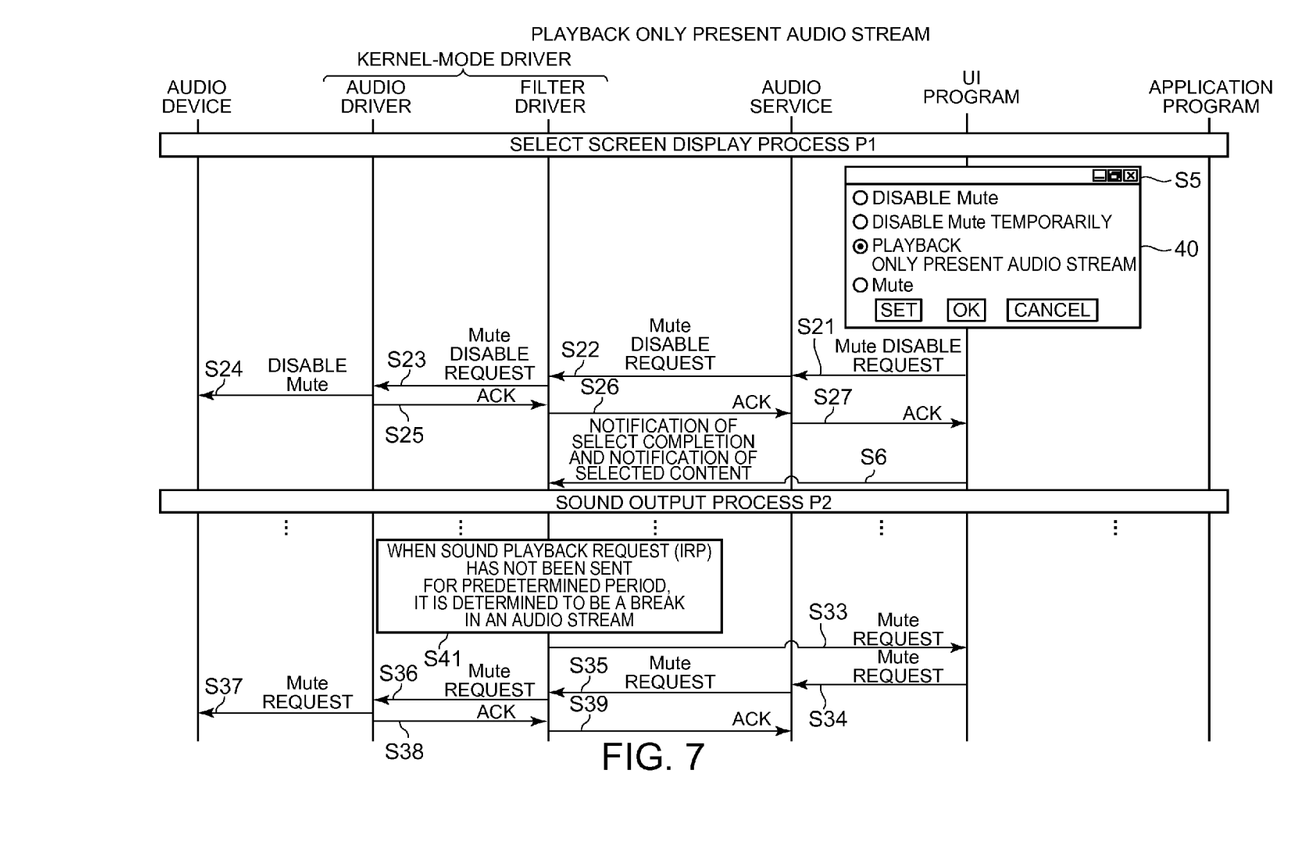
FIG. 7 is a schematic flow chart diagram illustrating one embodiment of a user-selected sound output process where playback only present audio stream is selected on a select screen method.

Next, a user-selected sound output process of the laptop PC 1 shown in FIG. 3 will be described with reference to FIGS. 4 to 7. FIGS. 4 to 7 are flowcharts illustrating a user-selected sound output process. Specifically, FIG. 4 illustrates a process when Mute is selected on the select screen 40, FIG. 5 illustrates a process when disable Mute is selected on the select screen 40, FIG. 6 illustrates a process when disable Mute temporarily is selected on the select screen 40, and FIG. 7 illustrates a process when playback only present audio stream is selected on the select screen 40.

The process when Mute is selected on the select screen 40 will be described with reference to FIG. 4. In FIG. 4, when the application program 33 starts outputting sound, the application program 33 transmits a sound playback request (packet) to the audio service 30a (S1). Upon receiving the sound playback request from the application program 33, the audio service 30a transmits a sound playback request (IRP) to the kernel-mode driver (S2). When Mute is set, the filter driver 31b intercepts the sound playback request (IRP) and outputs a select screen display request to the UI program 30b (S3). Upon receiving the select screen display request from the filter driver 31b, the UI program 30b displays the select screen 40 (S4). The processing of S1 to S4 will be referred to as a select screen display process P1.

In this select screen 40, Mute is set. On this select screen 40, the user selects processing (S5). Here, when the user selects Mute, the UI program 30b sends a notification of select completion and a notification of selected content (Mute) to the filter driver 31b (S6). Upon receiving the notification of select completion and the selected content (Mute), the filter driver 31b outputs a sound playback request (IRP) to the audio driver 31a (S7). The audio driver 31a outputs audio information corresponding to the sound playback request (IRP) to the audio device 50 (S8). Since the audio device 50 is set to Mute, external sound output is disabled.

After outputting the audio information to the audio device 50, the audio driver 31a outputs ACK to the filter driver 31b (S9). Upon receiving ACK from the audio driver 31a, the filter driver 31b outputs ACK to the audio service 30a (S10). Upon receiving ACK from the filter driver 31b, the audio service 30a outputs ACK to the application program 33 (S11). Upon receiving ACK from the audio service 30a, the application program 33 outputs a next sound playback request to the audio service 30a, whereby audio information is output to the audio device 50 through the audio service 30a, the filter driver 31b, and the audio driver 31a (S13 to S15). As described above, as to the sound playback request issued immediately after Mute is selected (alternatively after the elapse of a user-selected time), the filter driver 31b does not output a select screen display request but outputs a sound playback request (IRP) to the audio driver 31a. Then, the audio driver 31a outputs ACK to the filter driver 31b (S16), and upon receiving ACK through the filter driver 31b and the audio service 30a (S17 and S18), the application program 50 outputs a next sound playback request to the audio service 30a. This processing is repeatedly executed until the sound output ends. The processing of S7 to S18 is referred to as a sound output process P2.

The process when Disable Mute is selected on the select screen 40 will be described with reference to FIG. 5. In FIG. 5, the same steps as those of FIG. 4 will be denoted by the same step numbers, and only the difference will be described.

In FIG. 5, when the user selects Disable Mute on the select screen 40 (S5), the UI program 30b outputs a Mute disable request to the audio service 30a (S21). Upon receiving the Mute disable request from the UI program 30b, the audio service 30a outputs a Mute disable request to the filter driver 31b (S22). Upon receiving the Mute disable request from the audio service 30a, the filter driver 31b outputs a Mute disable request to the audio driver 31a (S23). The audio driver 31a causes the audio device 50 to disable Mute (S24). In this way, Mute is disabled and external sound output is enabled. After that, the audio driver 31a outputs ACK to the filter driver 31b (S25). Upon receiving ACK from the audio driver 31a, the filter driver 31b outputs ACK to the audio service 30a (S26). Upon receiving ACK from the filter driver 31b, the audio service 30a outputs ACK to the UI program 30b (S27).

The UI program 30b sends a notification of select completion and a notification of selected content (Disable Mute) to the filter driver 31b (S6). After that, the sound output process P2 is performed, and the audio information of the application program 33 is output by the audio device. In this way, audio information can be output from the beginning: that is, it is possible to prevent audio information from being output midstream.

The process when disable Mute temporarily is selected on the select screen 40 will be described with reference to FIG. 6. In FIG. 6, the same steps as those of FIG. 5 will be denoted by the same step numbers, and only the difference will be described.

In FIG. 6, when the user selects Disable Mute Temporarily on the select screen 40 (S5), similarly to FIG. 5, the UI program 30b outputs a Mute disable request to the audio service 30a (S21) and causes the audio device 50 to disable Mute (S22 to S27). In this way, Mute is disabled and external sound output is enabled. Upon receiving ACK (S25 to S27), the UI program 30b sends a notification of select completion and a notification of selected content (Disable Mute Temporarily) to the filter driver 31b (S6). The filter driver 31b starts counting the elapsed time (S31). After that, the sound output process P2 is performed, and the audio information of the application program 33 is output by the audio device.

When the predetermined period has elapsed during execution of the sound output process P2 (S32), the filter driver 31b outputs a Mute request to the UI program 30b (S33). Upon receiving the Mute request from the filter driver 31b, the UI program 30b outputs a Mute request to the audio service 30a (S34). Upon receiving the Mute request from the UI program 30b, the audio service 30a outputs a Mute request to the filter driver 31b (S35). Upon receiving the Mute request from the audio service 30a, the filter driver 31b outputs a Mute request to the audio driver 31a (S36). The audio driver 31a outputs a Mute request to the audio device 50 (S37). In this way, the audio device 50 is set to Mute, and the external sound output is silenced. After that, the audio driver 31a outputs ACK to the filter driver 31b (S38). Upon receiving ACK from the audio driver 31a, the filter driver 31b outputs ACK to the audio service 30a (S39).

The process when Playback Only Present Audio Stream is selected on the select screen 40 will be described with reference to FIG. 7. In FIG. 7, the same steps as those of FIG. 6 will be denoted by the same step numbers, and only the difference will be described.

In FIG. 7, when the user selects Playback Only Present Audio Stream on the select screen 40 (S5), similarly to FIG. 5, the UI program 30b outputs a Mute disable request to the audio service 30a (S21) and causes the audio device 50 to disable Mute (S22 to S27). In this way, Mute is disabled and external sound output is enabled. Upon receiving ACK (S25 to S27), the UI program 30b sends a notification of select completion and a notification of selected content (Playback Only Present Audio Stream) to the filter driver 31b (S6). After that, the sound output process P2 is performed, and the audio information of the application program 33 is output by the audio device.

The filter driver 31b measures the transmission intervals of the sound playback request (IRP) during execution of the sound output process P2. When the sound playback request (IRP) has not been sent for a predetermined period, it is determined to be a break in an audio stream (S41). Then, similarly to FIG. 6, the filter driver 31b outputs a Mute request to the UI program 30b (S33) and sets the audio device 50 to Mute (S34 to S39). In this way, the subsequent audio stream is silenced.

According to the, the information processing apparatus includes: the audio device 50 that outputs audio information; the filter driver 31b that detects a sound playback request from the application program 33 while the external output of the audio information of the audio device 50 is muted; and the UI program 30b that displays the select screen 40 for allowing the user to select processing when the sound playback request of the application program 33 is detected by the filter driver 31b, in which the filter driver 31b controls the execution of the processing selected by the user on the select screen 40. Therefore, it is possible to allow the user to select appropriate processing beforehand when an application program outputs sound in a state where an audio device is muted.

According to the present embodiment, when Disable Mute is selected on the select screen, the filter driver 31b disables Mute of the audio device 50, whereby the audio information of the application program can be output by the audio device 50 from the beginning.

According to the present embodiment, when Disable Mute Temporarily is selected on the select screen, the filter driver 31b disables Mute of the audio device 50 for a predetermined period, whereby the audio information of the application program can be output by the audio device 50 for a predetermined period.

According to the present embodiment, when Playback Only Present Audio Stream is selected on the select screen, the filter driver 31b disables Mute only during the playback of the present audio stream, whereby only the present audio stream can be output by the audio device 50.

In the embodiment described above, although the laptop PC has been described as an example of the information processing apparatus, other information processing apparatuses such as a desktop PC, a PDA, a tablet, and a cellular phone may also be used.

Moreover, in the embodiment described above, although Mute has been described as an example of a method of silencing sound output, the apparatus and methodology described herein can also be applied to a case where an audio volume is set to "0." Specifically, when a sound playback request is input from the application program 33 in a state where an audio volume is set to "0", a select screen for allowing the user to select appropriate processing may be displayed on the display device 5 so that the processing selected by the user is executed. In this case, for example, (1) Disable Audio Volume "0," (2) Temporarily Disable Audio Volume "0," (3) Playback Only Present Audio Stream, and (4) Audio Volume "0" may be displayed on the select screen.

The information processing apparatus, sound output setting method thereof, and computer-executable program can be widely applied to when a user selects appropriate processing when an application program outputs sound in a state where an audio device is silenced.

Embodiments may be practiced in other specific forms. The described embodiments are to be considered in all respects only as illustrative and not restrictive. The scope of this document is, therefore, indicated by the appended claims rather than by the foregoing description. All changes which come within the meaning and range of equivalency of the claims are to be embraced within their scope.

What is claimed is:

1. An apparatus comprising:
   a storage device storing machine readable code; and
   a processor executing the machine readable code, the machine readable code comprising:
      a silencing module that silences audio output from an audio device, wherein the silencing module comprises an audio driver that controls the external output of the audio of the audio device;
      a detection module that detects a sound playback request for an audio stream from an application program while silencing is set, wherein the detection module comprises
         an audio service that receives a sound playback request from the application program and outputs the sound playback request to a kernel-mode driver, and
         a filter driver that intercepts the sound playback request while the audio device is silenced and outputs a select screen display request, the filter driver further causing the audio driver to execute a processing option selected by a user on a select screen;
      a display module that displays the select screen to allow the user to select the processing option, wherein the processing option comprises one or more of enabling audio output for a predetermined period and enabling audio output for the audio stream only; and
      a processing module that executes the processing option selected by the user on the select screen.

2. The apparatus according to claim 1, wherein the processing option further comprises silencing audio output and enabling audio output.

3. The apparatus according to claim 1, further comprising the processing module causing the silencing module to enable audio output from the audio device for a predetermined period in response to the user selecting the enabling audio output for a predetermined period processing option on the selection screen.

4. The apparatus according to claim 1, further comprising the processing module causing the silencing module to only enable audio output for the audio stream in response to the user selecting the enabling audio output for the audio stream only processing option on the selection screen.

5. The apparatus according to claim 2, further comprising the processing module causing the silencing module to enable audio output for one or more other audio streams in response to the user selecting the enable audio output processing option on the selection screen.

6. The apparatus according to claim 2, further comprising the audio output being output from the beginning of the audio stream in response to the user selecting the enabling audio output processing option on the selection screen.

7. The apparatus according to claim 1,
   wherein the display module comprises:
      a user interface that displays a select screen for allowing a user to select processing responsive to the select screen display request being received; and
   wherein the processing module comprises:

an audio service that receives a sound playback request from an application program and outputs the sound playback request to a kernel-mode driver, and a filter driver that intercepts the sound playback request while the audio device is silenced and outputs a select screen display request, the filter driver further causing the audio driver to execute the processing selected by the user on the select screen.

8. A machine implemented method comprising:

silencing audio output from an audio device;

detecting a sound playback request for an audio stream from an application program while silencing is set, wherein detecting the sound playback request comprises
- receiving a sound playback request from the application program and outputting the sound playback request to a kernel-mode driver, and
- intercepting the sound playback request while the audio device is silenced and outputting a select screen display request;

displaying a select screen for allowing a user to select a processing option responsive to the sound playback request from the application program being detected in the detecting step, wherein the processing option comprises one or more of enabling audio output for a predetermined period and enabling audio output for the audio stream only; and executing the processing option selected by the user on the select screen, wherein executing the processing option comprises causing an audio driver that controls the external output of the audio of the audio device to execute the processing option selected by the user.

9. The method of claim 8, wherein the processing option further comprises silencing audio output and enabling audio output.

10. The method of claim 8, further comprising enabling audio output from the audio device for a predetermined period in response to the user selecting the enabling audio output for a predetermined period processing option on the selection screen.

11. The method of claim 8, further comprising only enabling audio output for the audio stream in response to the user selecting the enabling audio output for the audio stream only processing option on the selection screen.

12. The method of claim 9, further comprising enabling audio output for one or more other audio streams in response to the user selecting the enabling audio output processing option on the selection screen.

13. The method of claim 9, further comprising outputting the audio output from the beginning of the audio stream in response to the user selecting the enabling audio output processing option on the selection screen.

14. A program product comprising a non-transitory computer-readable medium storing machine readable code executed by a processor to perform the operation of:

silencing audio output from an audio device;

detecting a sound playback request for an audio stream from an application program while silencing is set, wherein detecting the sound playback request comprises
- receiving a sound playback request from the application program and outputting the sound playback request to a kernel-mode driver, and
- intercepting the sound playback request while the audio device is silenced and outputting a select screen display request;

displaying a select screen for allowing a user to select a processing option responsive to the sound playback request from the application program being detected in the detecting step, wherein the processing option comprises one or more of enabling audio output for a predetermined period and enabling audio output for the audio stream only; and executing the processing option selected by the user on the select screen, wherein executing the processing option comprises causing an audio driver that controls the external output of the audio of the audio device to execute the processing option selected by the user.

15. The program product of claim 14, wherein the processing option further comprises silencing audio output and enabling audio output.

16. The program product of claim 14, wherein the operation further comprises enabling audio output from the audio device for a predetermined period in response to the user selecting the enabling audio output for a predetermined period processing option on the selection screen.

17. The program product of claim 14, wherein the operation further comprises only enabling audio output for the audio stream in response to the user selecting the enabling audio output for the audio stream only processing option on the selection screen.

18. The program product of claim 15, wherein the operation further comprises enabling audio output for one or more other audio streams in response to the user selecting the enable audio output processing option on the selection screen.

19. The program product of claim 15, wherein the operation further comprises outputting the audio output from the beginning of the audio stream in response to the user selecting the enabling audio output processing option on the selection screen.

* * * * *